United States Patent [19]

Komstadius et al.

[11] Patent Number: 5,329,854
[45] Date of Patent: Jul. 19, 1994

[54] PROJECTILE FOR THE DISPERSAL OF A LOAD WITH TIME DELAY

[76] Inventors: Sven Komstadius, Snäckstigen 2, S-582 58 Linköping; Sören Hanberger, Förmansgatan 7, S-582 66 Linköping; Hans Ellström, Vitsippevägen 6, S-582 69 Linköping, all of Sweden

[21] Appl. No.: 861,784
[22] PCT Filed: Oct. 30, 1990
[86] PCT No.: PCT/SE90/00700
§ 371 Date: Jun. 16, 1992
§ 102(e) Date: Jun. 16, 1992
[87] PCT Pub. No.: WO91/07636
PCT Pub. Date: May 30, 1991

[30] Foreign Application Priority Data

Nov. 21, 1989 [SE] Sweden .................. 8903900-2

[51] Int. Cl.⁵ ........................................... F42B 12/70
[52] U.S. Cl. ........................................... 102/505
[58] Field of Search ............ 102/505, 501, 530, 531; 280/740, 741

[56] References Cited

U.S. PATENT DOCUMENTS

| | | | |
|---|---|---|---|
| 4,017,100 | 4/1977 | Gehrig et al. | 280/740 |
| 4,322,385 | 3/1982 | Goetz | 102/530 |
| 4,333,402 | 6/1982 | Landstrom et al. | 102/505 |
| 4,578,247 | 3/1986 | Bolieau | 280/741 |
| 4,858,951 | 8/1989 | Lenzen | 280/741 |
| 4,944,210 | 7/1990 | Flock et al. | 102/531 |
| 4,950,458 | 8/1990 | Cunningham | 102/530 |

Primary Examiner—David H. Brown
Attorney, Agent, or Firm—Lowe, Price, LeBlanc & Becker

[57] ABSTRACT

A projectile for the dispersal of a load with time delay after firing from a launching tube (1) with hot gas under pressure is described. It comprises a cylindrical casing (2) comprising a cross wall (3) on one side of which there is a first pressure chamber (7) limited outwardly by an external side wall (4), provided with a supply opening (5) for the hot gas. The cross wall (3) limits on its other side a second pressure chamber (9) which is formed by the casing and a piston (8) axially movable in the casing, which stands in connection with said load (10). A throttled gas connection (11) is provided between the first and second pressure chambers (7, 9). The piston (8), under the effect of a pressure built up in the second pressure chamber, is arranged to perform an axial movement, firing the load (10) out of the casing (2), but not until the pressure has reached a predetermined level. The projectile is characterized particularly in that a fibrous material (16) with relatively good thermal conductivity, for instance steel wool, is so arranged in the first pressure chamber (7), that the pressure in the gas conducted to the first pressure chamber remains relatively constant with time, whereby the pressure in the gas conducted to the second pressure chamber (9) shows a relatively constant increase per time unit.

1 Claim, 2 Drawing Sheets

PROJECTILE FOR THE DISPERSAL OF A LOAD WITH TIME DELAY

The present invention relates to a projectile for the dispersal of a load with time delay after firing from a launching tube with a hot gas under pressure. Such a projectile comprises a cylindrical casing with a first pressure chamber, formed by a portion of the casing together with a cross wall arranged in the casing and an external side wall provided with at least one supply opening for the hot gas to the first pressure chamber. The projectile further comprises a second pressure chamber, formed by a second portion of the casing, said cross wall and a piston axially movable with slide fitting in the casing, and the load, which stands in connection with the piston. A throttled gas connection is arranged between the first and second pressure chambers. The piston, under the effect of a built-up pressure in the second pressure chamber, is arranged to perform an axial movement firing the load out of the casing, but not until the pressure has reached a predetermined level.

Such projectiles are known for instance from Swedish patent No. 7802120-1, which describes a projectile for firing and dispersing a load consisting of a multiplicity of tightly packed, radar-reflecting strips in a casing. This projectile is fired from a launching tube by means of highly compressed pressure air which upon firing flows into the first pressure chamber via a check valve and flows thereafter at limited flow rate through the throttled gas connection into the second pressure chamber, where a gas pressure builds up to a predetermined level, which is determined by the shearing resistance in an interlocking pin that keeps said piston with the load in a starting position. When the gas pressure has become sufficiently high, the pressure force acting upon the piston in the axial direction brings about that the interlocking pin is sheared off, and the piston with the load is pushed out of the casing, thus enabling the load to be dispersed. The projectile that is described in Swedish patent No. 7802120-1 is therefore primarily intended to be fired with compressed air having the temperature of the surroundings, but it can also, from a constructive point of view, be fired with hot gas under pressure, such as detonation gas.

It is essential, however, that the time delay after the firing of the projectile from a launching tube can be predetermined with relatively great precision, which requires that the construction is such that the building up of the pressure in the second pressure chamber proceeds well-defined and with adjusted pressure increase per time unit.

If firing is effected with gas under pressure obtained through the detonation of a charge, naturally, the gas will initially have a relatively high temperature, and will also be mixed with a certain portion of more or less finely disintegrated particles. On firing, this hot gas flows into the first pressure chamber and there it is cooled off relatively quickly by the walls that form the pressure chamber, i.e. a first portion of the casing, the cross wall and the side wall, all usually made of metal. Thereby, the pressure in the second pressure chamber into which flows the relatively hot gas through said throttled gas connection will, as a function of time, have a relatively flat course, which makes it difficult to determine with the desired precision the desired time delay, which depends on the pressure increase to a predetermined, desired level.

In addition, due to the fact that the gas is mixed with particles, there is a risk that the throttled gas connection will be choked up.

The object of the present invention is therefore to obtain a projectile of the kind mentioned by way of introduction, which is suitable for firing with gas under pressure that is obtained by means of detonating a charge at which the time delay can be determined with good precision.

Such a projectile is characterized primarily in that a fibrous material with relatively good thermal conductivity is so arranged in the first pressure chamber that the pressure in the gas conducted to the first pressure chamber remains relatively constant with time, whereby the pressure in the gas conducted to the second pressure chamber shows a relatively constant increase per time unit.

The invention will now be described in more detail with reference to the two accompanying figures, of which:

Figure 1:
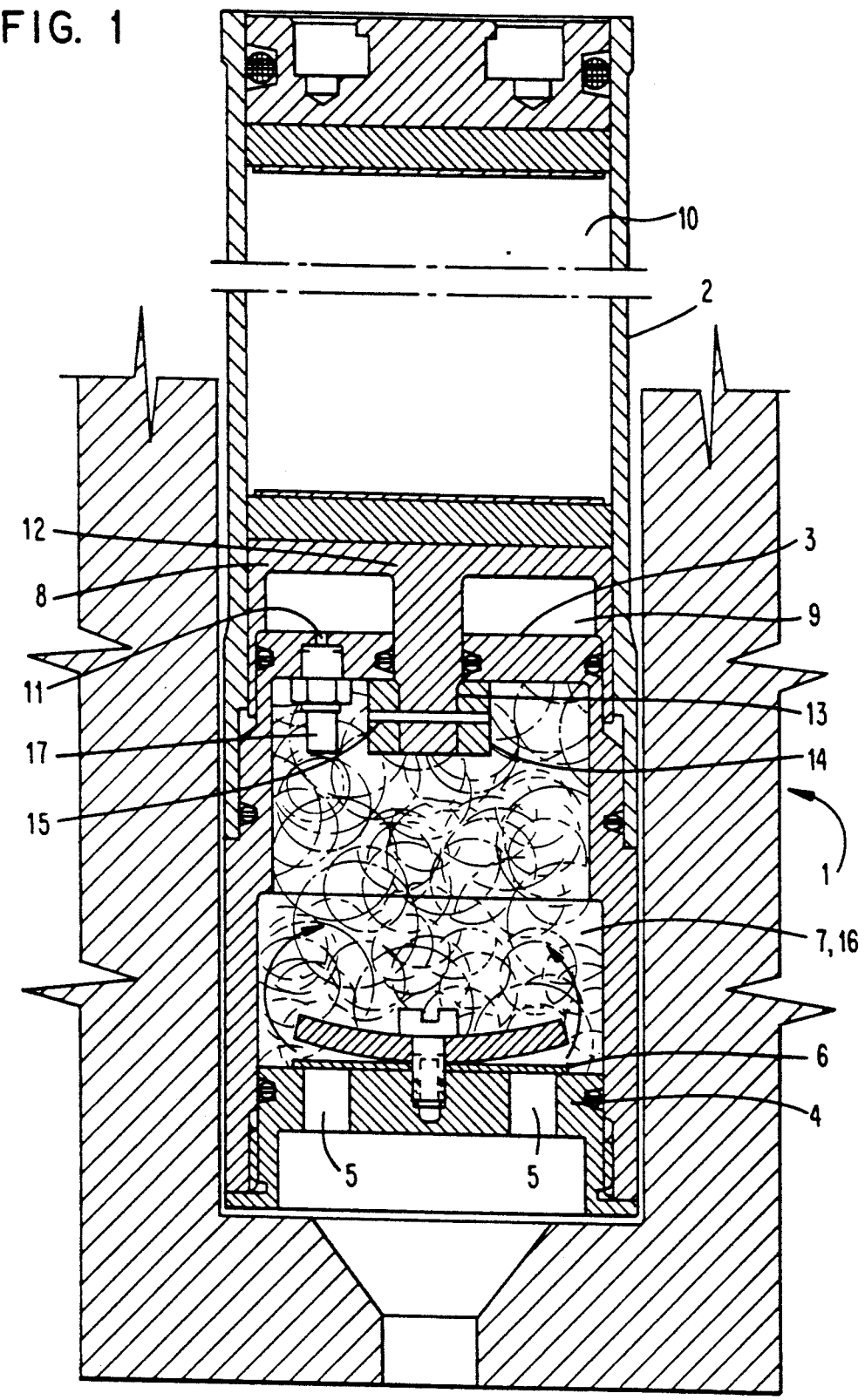
FIG. 1 shows, schematically in longitudinal section, a projectile according to the invention.

In FIG. 1 a launching tube is designated by 1, a projectile casing by 2, a cross wall arranged in the casing by 3 and an external side wall by 4. The side wall is provided with two supply openings 5 for, hot gas. A check valve, designated by 6, is arranged to allow gas to pass into but not out of a first pressure chamber 7, which is formed by the casing 2, the cross wall 3 and the side wall 4. A piston 8 is arranged axially movable with slide fitting within the casing, a second pressure chamber 9 being formed by the casing 2, the cross wall 3 and the piston 8.

On the side of the piston turned away from the second chamber there is a load, here only schematically presented by 10. The load can be of different kinds, such as a packet of strips of radar-reflecting strips, which are intended to be dispersed on firing the projectile, or a pyrotechnic charge, which is ignited and dispersed at the moment of firing, in both cases with the desired time delay. Other types of charges are of course conceivable.

Every type of charge requires its special design of the piston etc., but the designs do not form part of the present invention.

A throttled, calibrated gas connection in the form of a channel 11 with a relatively small cross section is arranged in the cross wall between the first and second pressure chambers 7, 9. The piston 8 is provided with a central dowel 12, which in a starting position is arranged to be movable with slide fitting in a corresponding cylindrical opening 13 in the cross wall 3. On its side facing the first pressure chamber 7 a sleeve 14 is arranged provided with a transverse shear pin 15. The first pressure chamber 7 is filled with a fibrous material 16 with relatively good thermal conductivity, in this case steel wool, but other material is also conceivable. As an extra safety measure there is a filter, designated by 17, arranged in the flow path to the channel 11 to ensure that the channel is not choked up by particles.

Figure 2:
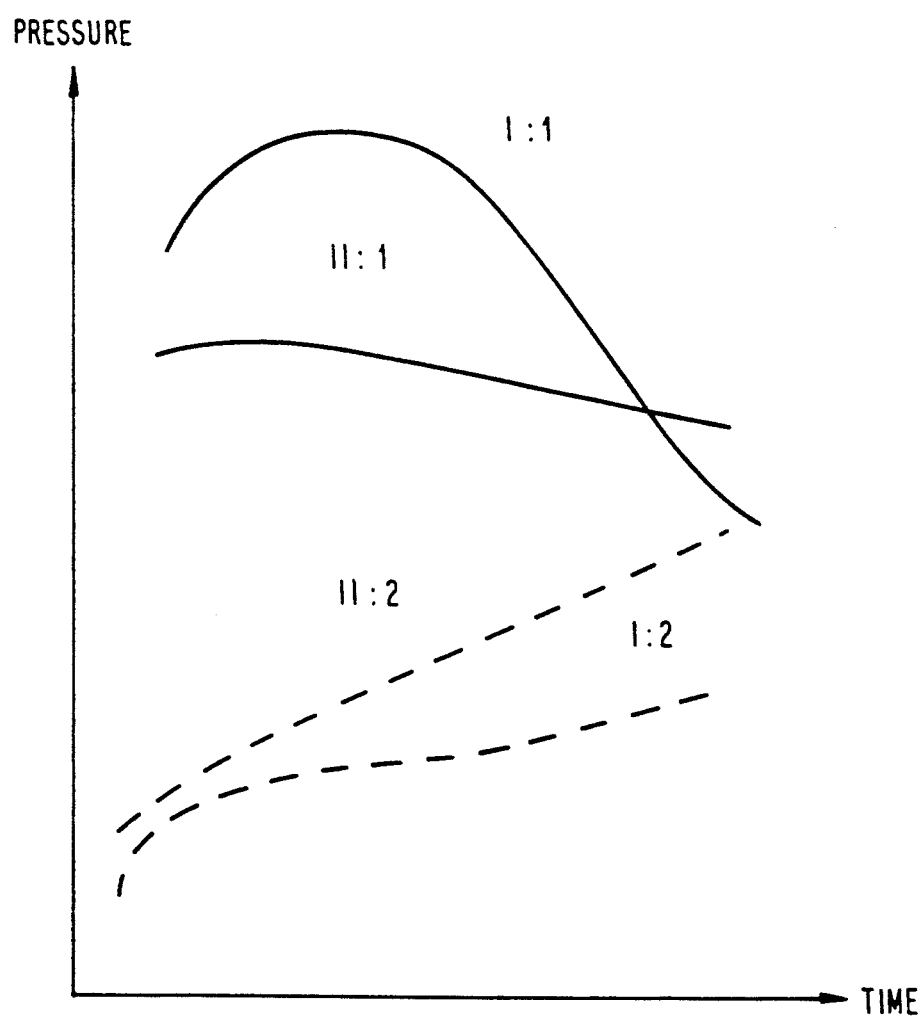
FIG. 2 shows, principally, the pressure course in the gas in the first and second pressure chambers, without and with filling with a fibrous material in the first pressure chamber, according to the invention.

FIG. 2 illustrates the gas pressure course with time in the first and second pressure chambers, 7, 9, respectively, on firing with a detonating booster charge from the launching tube 1. The gas pressure in the first pressure chamber 7 is represented by the graph II:1, while the gas pressure in the second pressure chamber 9 is presented by the graph II:2. The gas pressure in the first pressure chamber is rather constant during the important period of time, and therefore the gas pressure in the second pressure chamber shows a relatively constant pressure increase per time unit. Thereby said time delay for the expulsion of the load can be predetermined with good precision, as this time delay is defined by the pressure force that the gas pressure in the second pressure chamber exerts on the shear pin 15. When the shear pin breaks, the piston 8 with the load 10 is expelled axially through the casing, first by the gas pressure already built up in the second pressure chamber 9, and then when the piston has travelled a certain axial length by the somewhat increased gas pressure in said second pressure chamber that is obtained by gas flowing from the first pressure chamber through the opening 13 to the second pressure chamber.

If there was no fibrous material 16 in the first pressure chamber 7, the gas pressure in the first and second pressure chambers, respectively, would show courses principally according to the graphs I:1 and I:2 in FIG. 2. The reason for this is that the hot gas would be cooled off by the parts forming the first pressure chamber, so that the gas pressure therefore would fall relatively rapidly, which would give to the gas pressure course in the second pressure chamber a relatively flat course, which would obstruct an adjustment of the desired time delay. In addition, there would be the risk that the channel 11 with a relatively small cross section would be choked up by more or less finely disintegrated particles in the hot gas from the detonation of the booster charge.

By arranging a fibrous material of the mentioned kind in the first pressure chamber, it is obtained partly a possibility of good precision on adjustment of the desired delay of the dispersal of a load after firing with hot gas under pressure from a launching tube, and partly a reliable function.

We claim:

1. A projectile for the dispersal of a load with a predetermined time delay after firing the projectile from a launching tube (1) by means of a hot gas under pressure, comprising a cylindrical casing (2) with a first pressure chamber (7) formed by a portion of the casing (2), a cross wall (3) within the casing and an external side wall (4), provided with at least one supply opening (5) for the hot gas to the first pressure chamber (7), further comprising a second pressure chamber (9), formed by a second portion of the casing (2), said cross wall (3) and a piston (8) axially movable with slide fitting in the casing, further comprising said load (10) standing in connection with the piston (8) axially movable with slide fitting in the casing, a throttled gas connection (11) being arranged between the first and second pressure chambers (7, 9), the piston (8), under the effect of a pressure built up in the second pressure chamber (9), being arranged to make an axial movement, but not until the pressure has reached a predetermined level, shooting the load (10) out of the casing (2), characterized in that a fibrous material (16) with relatively good thermal conductivity is so arranged in the first pressure chamber (7) that the pressure in the gas conducted to the chamber remains relatively constant with time, so that the pressure in the gas conducted to the second pressure chamber (9) shows a relatively constant increase per time unit.

* * * * *